(12) United States Patent
Appel et al.

(10) Patent No.: US 12,397,299 B2
(45) Date of Patent: Aug. 26, 2025

(54) TEMPERATURE CONTROL DEVICE

(71) Applicant: Biometra GmbH, Göttingen (DE)

(72) Inventors: Eggert Appel, Adelebsen (DE); Jens Ohlenbusch, Göttingen (DE)

(73) Assignee: BIOMETRA GMBH, Göttingen (DE)

( * ) Notice: Subject to any disclaimer, the term of this patent is extended or adjusted under 35 U.S.C. 154(b) by 831 days.

(21) Appl. No.: 17/753,568

(22) PCT Filed: Aug. 20, 2020

(86) PCT No.: PCT/EP2020/073386
§ 371 (c)(1),
(2) Date: Mar. 8, 2022

(87) PCT Pub. No.: WO2021/047879
PCT Pub. Date: Mar. 18, 2021

(65) Prior Publication Data
US 2022/0331805 A1  Oct. 20, 2022

(30) Foreign Application Priority Data
Sep. 12, 2019 (DE) .......................... 102019124588.5

(51) Int. Cl.
*B01L 7/00* (2006.01)
*G01K 1/02* (2021.01)
(Continued)

(52) U.S. Cl.
CPC ................ *B01L 7/52* (2013.01); *G01K 1/026* (2013.01); *G01K 3/08* (2013.01); *G01K 15/005* (2013.01);
(Continued)

(58) Field of Classification Search
CPC ................ B01L 7/52; B01L 2200/147; B01L 2200/148; B01L 2300/18;
(Continued)

(56) References Cited

U.S. PATENT DOCUMENTS 5,602,756 A * 2/1997 Atwood ............ G05D 23/1917
165/205
6,767,512 B1  7/2004 Lurz et al.
(Continued)

FOREIGN PATENT DOCUMENTS

CN  103857464 A  6/2014
CN  105960283 A  9/2016
(Continued)

OTHER PUBLICATIONS

Machine Translation of EP0642831 (Year: 2025).*
Machine Translation of WO2018103949 (Year: 2025).*

*Primary Examiner* — Michael L Hobbs
(74) *Attorney, Agent, or Firm* — Brannon Sowers & Cracraft PC

(57) ABSTRACT

A device for thermal treatment of samples includes: a base unit with a receiving region for a sample carrier; a temperature control block arranged in the receiving region; a lid; a temperature sensor for detecting a temperature of the temperature control block; a control unit for heating and cooling the temperature control block; and a reference element for in situ calibrating, validating and/or adjusting of the temperature sensor, which reference element is comprised of a material having at least one phase change at at least one predetermined phase change temperature in a temperature range suitable for calibrating the temperature sensor, during which phase change the material remains in the solid state.

19 Claims, 3 Drawing Sheets

(51) Int. Cl.
*G01K 3/08* (2006.01)
*G01K 15/00* (2006.01)
*G05D 23/19* (2006.01)

(52) U.S. Cl.
CPC ..... *G05D 23/1931* (2013.01); *G05D 23/1951* (2013.01); *B01L 2200/147* (2013.01); *B01L 2300/18* (2013.01); *B01L 2300/1894* (2013.01)

(58) Field of Classification Search
CPC .. B01L 2300/1894; G01K 1/026; G01K 3/08; G01K 15/005; G01K 7/00; G01K 7/36; G01K 11/06; G05D 23/1951
See application file for complete search history.

(56) References Cited

U.S. PATENT DOCUMENTS

| | | | |
|---|---|---|---|
| 2005/0145273 A1 | 7/2005 | Atwood et al. | |
| 2008/0003649 A1* | 1/2008 | Maltezos | B01L 3/50851 |
| | | | 435/286.1 |

FOREIGN PATENT DOCUMENTS

| | | | | |
|---|---|---|---|---|
| CN | 110168327 A | 8/2019 | | |
| EP | 0642831 | * | 3/1995 | ................ B01L 7/00 |
| EP | 0642831 A1 | 3/1995 | | |
| EP | 2612122 B1 | 7/2013 | | |
| WO | 2007112114 A2 | 10/2007 | | |
| WO | 2017048987 A1 | 3/2017 | | |
| WO | 2018103949 | 6/2018 | | |
| WO | WO-2018103949 A1 * | 6/2018 | | ............. G01K 11/00 |
| WO | 2018127348 A1 | 7/2018 | | |
| WO | 2018127357 A1 | 7/2018 | | |

* cited by examiner

TEMPERATURE CONTROL DEVICE

CROSS-REFERENCE TO RELATED APPLICATIONS

The present application is related to and claims the priority benefit of German Patent Application No. 10 2019 124 588.5, filed on Sep. 12, 2019, and International Patent Application No. PCT/EP2020/073386, filed Aug. 20, 2020, the entire contents of which are incorporated herein by reference.

TECHNICAL FIELD

The invention relates to a device for thermal treatment of samples, comprising a base unit with a receiving region for receiving at least one sample carrier, a temperature control block arranged in the receiving region, a lid for closing the receiving region, which lid is embodied in an application position to exert a predeterminable pressing force on the sample carrier arranged in the temperature control block, a temperature sensor for registering a temperature of the temperature control block, and a control unit for heating and cooling the temperature control block to a predeterminable temperature.

BACKGROUND

Many standard techniques in biotechnology and molecular biology require the performing of thermally controlled process steps, for which special temperature control devices are applied. For the well-known polymerase chain reaction (PCC), for example, thermocyclers are used, which are able automatically to perform the different temperature cycles of a polymerase chain reaction. Real time thermocyclers are, moreover, equipped with optical systems for fluorescence measurement. Other examples of such temperature control devices include, for example, the thermoshakers, incubators and other laboratory devices known in the state of the art.

For thermal treatment of a sample, the sample carrier, for example, a microwell plate, is placed in the temperature control block, which can have a plurality of a receiving locations for reaction containers, which can be embodied, for example, as recesses in a surface of the temperature control block. The reaction containers can be embodied as receiving locations formed in a microwell plate, e.g., receiving locations formed as microwells. The microwells can be formed, for example, as wells in the microwell plate, which can engage in a corresponding receiving location in the temperature control block, when the microwell plate is brought to the temperature control block. There are, however, also microwell plates, e.g., the so-called 1536 microwell plates, in which the reaction containers are embodied in a beehive structure on a planar platform. For temperature control of samples contained in such microwell plates, a temperature control block with planer surface is used, which rests rear side against the microwell plate, when the microwell plate is placed on the temperature control block. There are thermocyclers, which use a lid to press reaction containers in tight thermal contact with the temperature control block. For this, a pressing force must be applied against the lid. For in-situ PCC, or hybridizing, moreover, object carriers are known, in which the sample is applied, in each case, on a surface area surrounded by a frame. Such samples applied on object carriers can likewise be thermally treated in thermocyclers.

In many cases, the lids of the device of the field of the invention are, furthermore, embodied in such a manner that they are heatable. In this way, especially the forming of condensate in an upper region of a sample carrier can be prevented.

Problematic in such devices can be so to set the temperature of the temperature control block that the samples achieve a certain, predeterminable temperature. In order to be able to assure a reliable working, systems are frequently used for temperature calibration, in order suitably to calibrate and/or adjust the measured temperature of the temperature control block.

A possibility for calibrating thermocyclers resides in the application of, especially calibrated, temperature sensors, which are so embodied that they can measure the temperature of the temperature control block. Frequently in this connection, separate calibration systems are used, in which each of the temperature sensors is specially adapted to the temperature control block and, for example, distributed in defined positions over the temperature control block. A calibrating, validating and/or adjusting occurs then at one or more predeterminable temperatures of the temperature control block. Disadvantageous in the case of such a solution is, however, that a separate system is required for the calibrating and/or adjusting.

Likewise it is known to integrate reference resistances in the temperature measuring path and to conduct comparative measurements relative to the reference resistances, in order to detect deviations of the temperature sensors from the desired values. In such a solution, it is, however, not possible directly to know the effect of any particular temperature sensor.

SUMMARY

Starting from the mentioned problems, an object of the invention is to provide a simple and reliable opportunity for temperature monitoring in a device of the field of the invention.

The object is achieved by the device and by the method of the present disclosure.

The device of the invention for thermal treatment of samples includes a base unit with a receiving region for receiving at least one sample carrier, a temperature control block arranged in the receiving region, a lid for closing the receiving region, which lid is embodied in an application position to exert a predeterminable pressing force on the sample carrier arranged in the temperature control block, a temperature sensor for registering a temperature of the temperature control block, and a control unit for heating and cooling the temperature control block to a predeterminable temperature.

For heating and cooling the temperature control block, Peltier elements are applied in many cases. These are sufficiently known in the state of the art. Peltier elements are, however, not absolutely necessary for the invention. Rather, all known means for heating and cooling the temperature control block can be used. Furthermore, it is be noted that devices of the invention can utilize one or more heating/cooling circuits. For example, one or more Peltier elements, preferably at least one Peltier element per heating/cooling circuit, can be used. In such case, it is, furthermore, especially advantageous that for each heating/cooling circuit at least one temperature sensor be used and arranged in such a manner that it registers the temperature of the temperature control block in the region of a heating/cooling circuit. The number of the temperature sensors can, however, also be more or less than the number of heating/cooling circuits.

The at least one temperature sensor can be arranged, for example, at least partially within a floor region of the temperature control block, and, for example, be introduced into the temperature control block via bores within such. The temperature sensor is, for example, a resistance element or a thermocouple.

The sample carriers can be both individual singular sample carriers, as well as also microwell plates, which comprise a plurality of individual sample carriers.

According to the invention, the device further includes a reference element for in situ calibrating, validating and/or adjusting of at least the temperature sensor, which reference element is composed at least partially of at least one material, which has in a temperature range relevant for calibrating the first temperature sensor at least one phase change at at least one predetermined phase change temperature, in the case of which phase change the material remains in the solid state. In this regard, comprehensive reference is taken to EP02612122B1. The reference element enables a direct, exact and lasting monitoring of the temperature sensors and the temperatures, to which the samples in the temperature control block are exposed to. Additionally, for calibrating and/or adjusting the at least one temperature sensor, a separate calibration system is no longer required. Rather, the calibrating and/or adjusting can be performed directly in the device and, in given cases, even during ongoing operation of the same.

A phase change in a material, in which the material remains in the solid state, is, for example, according to the Ehrenfest classification, a phase change of at least second order. In contrast with a phase change of first order, no, or only a negligible amount of, latent heat is given off during the phase change. When no, or only a negligible amount of, latent heat is released, it can—basically and independently of the selected classification for phase changes—be advantageously assured, among other things, that the temperature measured by means of the temperature sensor at the point in time of the occurrence of a phase change is not corrupted, especially not by released latent heat.

In an additional, in the present state of the art significantly more usable classification of phase changes, it is distinguished only between discontinuous (first order) and continuous (second order) phase changes (compare e.g., *Lexikon der Physik, Spektrum Akademischer Verlag*, Heidelberg, Berlin, Vol. 4, under the heading, "Phasenübergange and andere kritische Phänomene" (translation: Phase Changes and other Critical Phenomena")). In the case of this classification, again, for example, different ferroelectric materials can have both phase changes of first, as well as well as also second, order, wherein, in both cases, the material, in which a phase change takes place, remains in the solid state during the phase change.

Preferably, the material, of which the reference element is at least partially composed, is a ferroelectric material, a ferromagnetic material, or a superconductor, especially a high temperature superconductor. Correspondingly, the at least one phase change is a phase change from the ferroelectric to the paraelectric state or vice versa, from the ferromagnetic state to the paramagnetic state or vice versa or from the superconducting state to the normally conducting state or vice versa. The phase change temperature is correspondingly, for example, the Curie temperature of a material or the critical temperature.

A corresponding phase change includes a discontinuity of the second derivative of a thermodynamic variable, such as, for example, the pressure, the volume, the enthalpy, or the entropy as a function, for example, of temperature. Typically associated with a phase change is the change of a certain specific material property, for example, a change of crystal structure, or a change in a magnetic, electrical or dielectric property. Corresponding material-specific characteristics are known for a chosen reference element and can be taken into consideration for calibrating, validating and/or selecting a temperature sensor. In such case, the at least one reference element can have one or more phase changes, especially phase changes in the solid state of a chosen material. Each phase change takes place at a certain characteristic fixed and durable temperature value, such that, in principle, no drift and/or aging effects need to be taken into consideration for the reference element.

In an embodiment, the device includes, thus, an electronics, which is embodied to determine the phase change based on a characteristic, physical or chemical variable of the material, wherein the at least one characteristic, physical or chemical variable is preferably the crystal structure, the volume, or a dielectric, electrical, or magnetic property of the material.

A preferred embodiment provides that the temperature sensor and the reference element are introduced into the temperature control block, especially into a floor region of the temperature control block. For example, one or more bores can be introduced into the temperature control block, in which the temperature sensor and the reference element are arranged.

The at least one temperature sensor and the reference element can, in such case, be arranged in the same or in different regions of the temperature control block. For example, when the temperature control block is provided with bores, they can be arranged in the same bore or in different bores.

Thus, an embodiment of the device of the invention includes that at least one temperature sensor and one reference element are arranged next to one another, in such a manner that the temperature sensor and the reference element are exposed to essentially the same temperature.

Another embodiment includes that at least two temperature sensors are present, which are arranged in different regions of the temperature control block. In this way, especially a temperature profile of the temperature control block can be determined. Thus, for example, it can be detected, whether the temperature in an edge region of the temperature control block differs from the temperature in a middle region of the temperature control block.

Another embodiment of the device of the invention includes that at least one temperature sensor has a predeterminable separation from the reference element.

Thus, numerous and most varied of embodiments are possible for the arrangement and number of applied temperature sensors and reference elements and all fall within the scope of the invention. Some especially preferred arrangements are described in greater detail in the appended figures.

The device is preferably a thermocycler, a real time thermocycler, a thermoshaker, or an incubator. However, also other devices for thermal treatment of samples can be used and fall within the scope of the invention.

The object underlying the invention is achieved, furthermore, by a method for operating a device of the invention according to at least one of the described embodiments. The method includes, in such case, method steps as follows:

detecting a phase change in the reference element, especially based on an, especially abrupt, change of a characteristic, physical or chemical reference variable of the reference element, preferably as a function of time, determining a phase change point in time, at which the phase change has taken place, determining a measured value of temperature of the temperature sensor at a measuring point in time, which has the shortest length of time from the phase change point in time, and comparing the measured value of temperature with the phase change temperature and/or determining an, in given cases present, difference between the temperature measured value and the phase change temperature.

Preferably, the values obtained from the at least one temperature sensor and the reference element—the measured values and the reference values—can be recorded as a function of time.

A preferred embodiment of the method provides that in a checking mode the temperature control block is heated or cooled in such a manner that a phase change takes place in the reference element. The temperature control block is, thus, heated or cooled in such a manner that the phase change temperature is ex- or subceeded. It is, however, also an option that the method be executed during ongoing operation of the device.

In the case of at least two temperature sensors, preferably for each temperature sensor a reconciliation of its measured value of temperature with the phase change temperature is performed.

Another embodiment of the method includes determining whether the difference between the temperature measured value and the phase change temperature exceeds a predeterminable limit value. Such can especially be advantageous, when the temperature sensor is arranged at a predeterminable separation from the reference element. However, also in the case of a reconciliation of a temperature sensor arranged essentially at the site of the reference element, the provision of a predeterminable limit value can make sense.

In another embodiment of the method, based on comparison between the temperature measured value and the phase change temperature, a condition monitoring of the temperature sensor is performed. Especially, in the case of provision of a predeterminable limit value, information concerning condition of the temperature sensor can be issued when the difference exceeds the predeterminable limit value.

Thus, another preferred embodiment includes that, based on the comparison between the temperature measured value and the phase change temperature, a calibration, a reconciliation, especially an adjustment, or a validation of the temperature sensor is performed. In the case of a temperature sensor in the form of a resistance element, for example, the characteristic line of the temperature sensor can be suitably corrected.

Another especially preferred embodiment includes that, based on comparison between the temperature measured value and the phase change temperature, a heating- or cooling power of the control unit of the device is set. In this way, a change of the needed heating- or cooling power upon introduction of a sample carrier into the temperature control block can be taken into consideration. The sample carrier with the at least one sample has, compared with the temperature control block, different thermal properties, which can influence the temperature of the temperature control block as a function of the heating- or cooling power.

Also the lid has an influence on the measured temperatures. Thus, it is, furthermore, advantageous that the method of the invention be performed in a known positioning of the lid relative to the temperature control block, for example, when the lid is closed, thus, is located in the application position.

It is to be noted here that the embodiments described in connection with the device can be applied mutatis mutandis also for the method and vice versa.

The invention as well as its advantageous embodiments will now be explained in greater detail based on the appended drawing, the figures of which show as follows:

DETAILED DESCRIPTION

Figure 1:
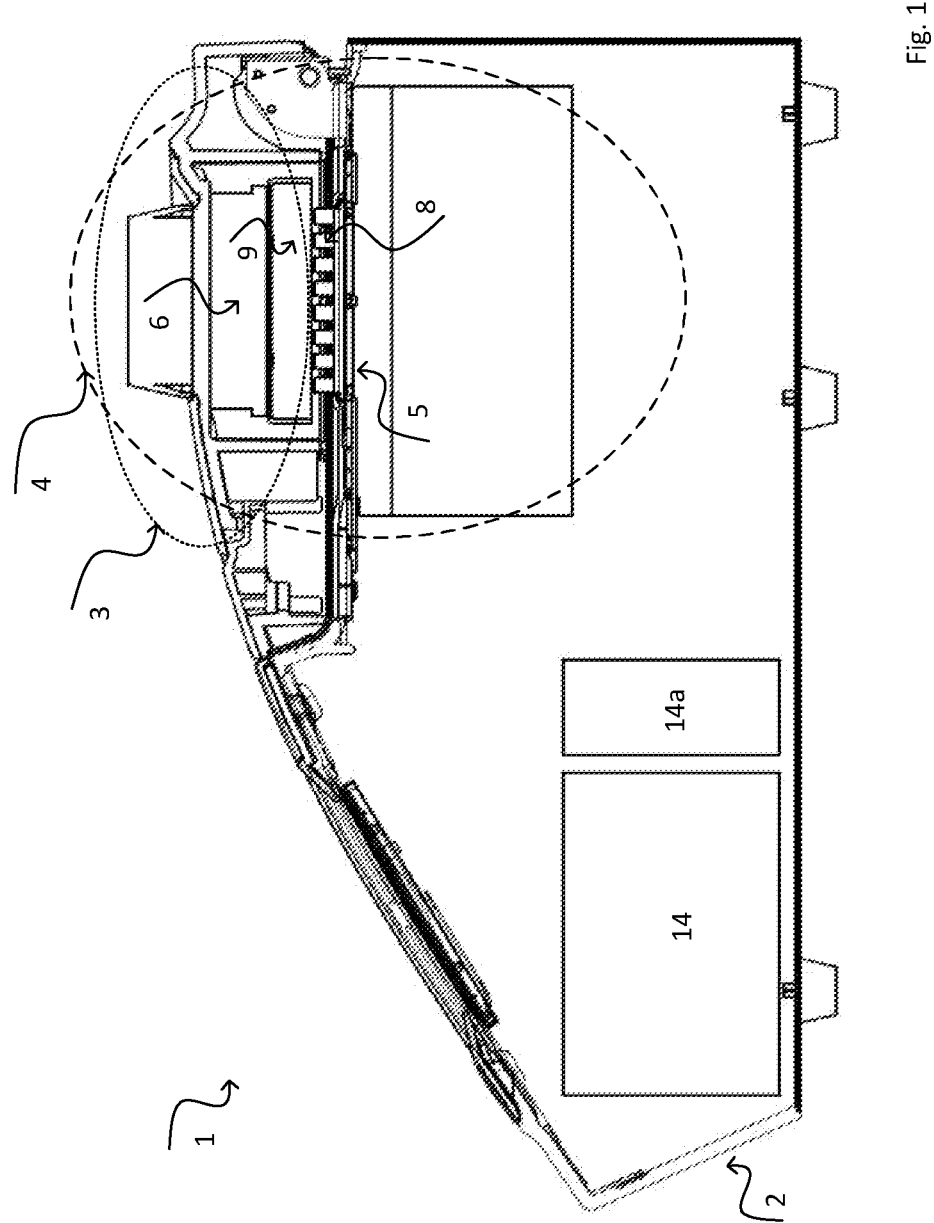
FIG. 1 shows a schematic drawing of a device in the form of a thermocycler for thermal treatment of samples.

FIG. 1 shows a schematic drawing of a temperature control device 1 in the form of a thermocycler. The invention, is, however, not limited to devices 1 in the form of thermocyclers, but, instead, can be used for any device 1 for thermal treatment of samples, especially in the laboratory field. The device 1 of FIG. 1 includes a base unit 2 and a lid 3. Arranged in the base unit 2 is a module 4 for temperature control of samples with a temperature control block 5. The region located above the temperature control block 5 is referred to as the receiving region 6, in which at least one sample carrier 7 (not shown) with at least one sample can be arranged. The sample carrier 7 can be, for example, a microwell plate, which has a plurality of wells serving as reaction containers for samples.

The temperature control block 5 is made of a material with high thermal conductivity, especially a metal, and includes a plurality of a receiving locations 8 for the sample carrier 7. The receiving locations 8 are arranged on a platform area of the temperature control block 5. Such an embodiment of the temperature control block 5 is, however, not absolutely required. Rather, the temperature control block 5 can in other embodiments be embodied also to be planar in the region of its platform area, or possible receiving locations 8 can also have other geometric forms than the cylindrical receiving locations 8 shown in FIG. 1.

The lid 3 includes a cover plate 9, which is heatable for the embodiment shown in this case, and which, when the lid 3 is located in the application position, lies against the sample carrier 7 and exerts a predeterminable pressing force on the sample carrier arranged in the temperature control block 5. The temperature control block 5, the sample carrier 7 and the cover plate 9 are oriented in parallel with one another in the application position.

In order to heat or to cool the temperature control block 5, the device 1 includes, furthermore, a control unit 14a, which can be arranged, for example, in the base unit 2. Control unit 14a is embodied in this case as a separate unit. It can, however, also be a subpart of an electronics 14, which can perform other functions besides the control. The electronics 14 can according to the invention also serve for monitoring the phase change in the reference element 17 of the invention.

Figure 2A:
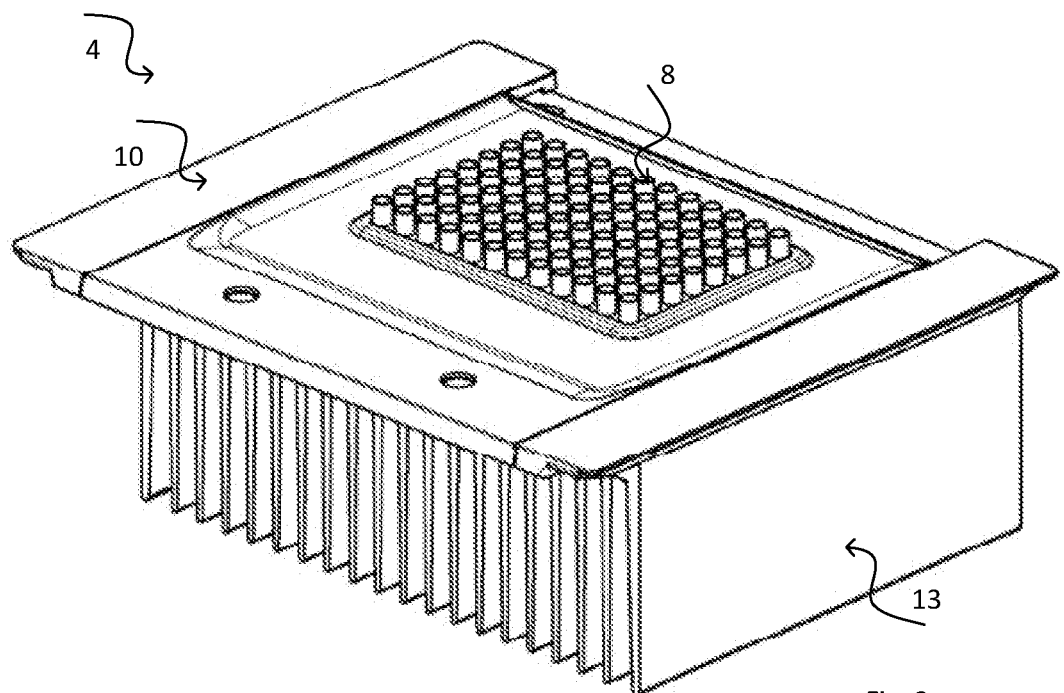
FIGS. 2a and 2b each show perspective views of a module for temperature control of samples, which module is part of the device of the present disclosure.
Figure 2B:
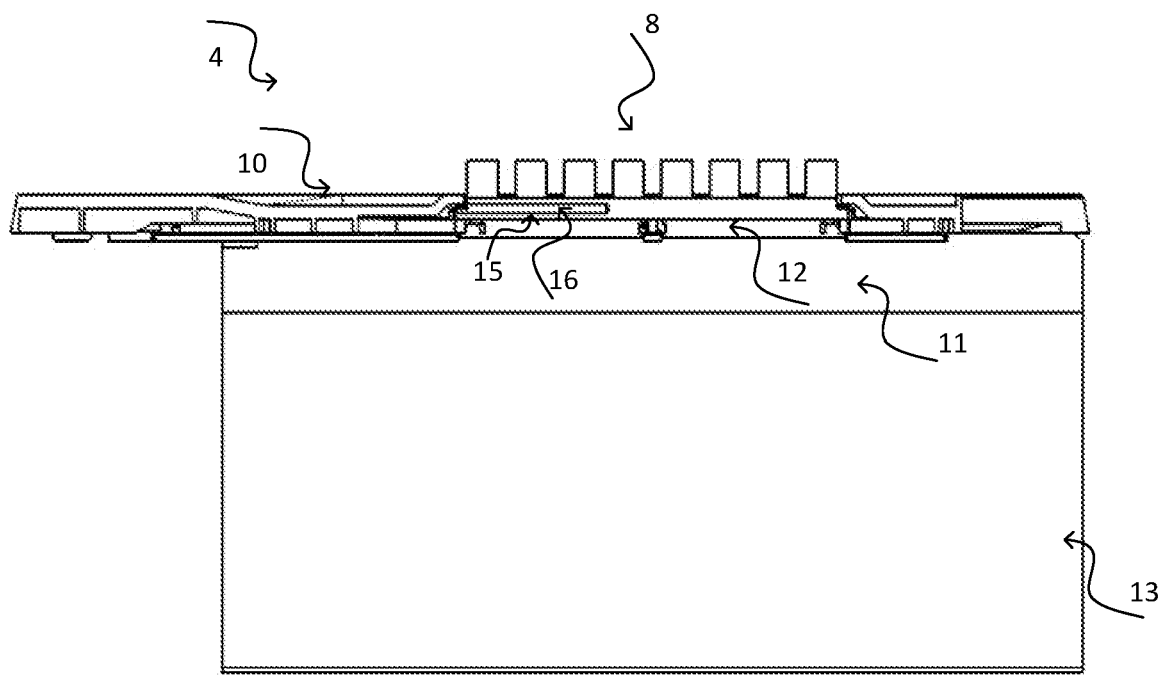

Detailed views of a module 4 for temperature control of samples are shown in FIG. 2 in two different views. In the view shown in FIG. 2a, the receiving locations 8 are cylindrically embodied and are suited especially for accommodating a sample carrier 7 in the form of a microwell plate. The temperature control block 5 is arranged in a cover frame 10, which exposes the temperature control block 5 with the receiving locations 8. Located beneath the temperature control block 5 is a temperature control system 11 with temperature control elements 12 and a heat sink 13. This is especially visible in the view of FIG. 2b. Heat sink 13 is covered by the cover frame 10. The temperature control elements 12 can comprise, for example, thermoelectric elements, such as, for example, Peltier elements.

In the view of the module 4 in FIG. 2b, furthermore, shown extending into the temperature control block 5 is a bore 15, in which a temperature sensor 16 is arranged. This temperature sensor 16 serves to register the temperature of the temperature control block 5 and, associated therewith, to register the temperatures of the samples in the sample carrier 7. Temperature sensor 16 is arranged, in such case, in a floor region of the temperature control block 5, thus, in a region of the temperature control block 5 opposite from the receiving locations 8. Also a plurality of temperature sensors 16 can be present in the temperature control block 5.

According to the invention, there is arranged, furthermore, in the temperature control block 5 a reference element 17, which serves for in situ calibrating, validating and/or adjusting of at least the temperature sensor 16. Also the reference element 17 can be placed in a bore 15 in the temperature control block 5, especially a bore 15 in a floor region of the temperature control block 5.

Three possible and preferred arrangements are shown in FIG. 3 by way of example for the one or more temperature sensors 16 and the reference element 17. Shown, in each case, is a sectional view of a floor F of the temperature control block. All temperature sensors 16 and reference elements 17 of the embodiment shown here are placed in the temperature control block via lateral bores 15 (not shown). It is noted, however, that the at least one temperature sensor 16 as well as the reference element 17 can also be introduced into the temperature control block 5 in other ways, which also fall within the scope of the invention.

In the case of the embodiment shown here, it is, furthermore, assumed by way of example that the temperature control system 11 is formed by three heating/cooling circuits HK1-HK3, wherein each heating/cooling circuit HK1-HK3 comprises two adjoining Peltier elements 12a, 12b. Of course, the arrangement of the temperature sensors 16 and the reference element 17 depends on the embodiment of the temperature control system 11, and different temperature control systems 11 can utilize differently many heating/cooling circuits HK, and the heating/cooling circuits do not necessarily have to involve Peltier elements 12a, 12b.

Figure 3A:
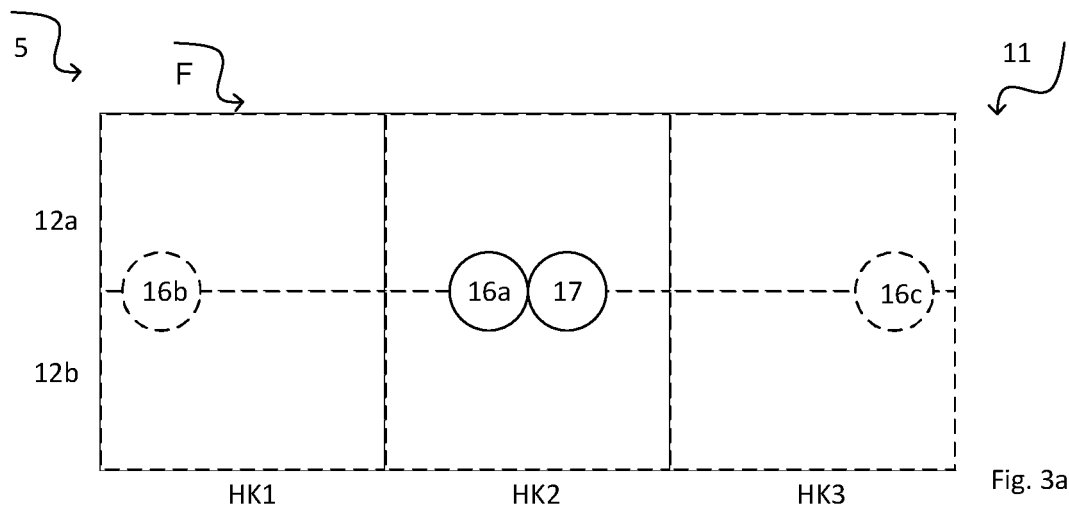
FIGS. 3a, 3b and 3c each show sectional views of a device of the present disclosure having a detection unit for detecting the presence of a sample carrier.

In the view shown in FIG. 3a, a temperature sensor 16a and a reference element directly adjoin one another in a middle region of the floor F of the temperature control block 5. They are located in a region of the second heating/cooling circuit HK2. Optionally, however, also other temperature sensors 16b and 16c can be provided. Thus in the case of the shown embodiment, temperature sensors 16b and 16c are located respectively in the regions of the first HK1 and third heating/cooling circuits HK3. Thus, a temperature sensor 16a-16c is present in each of the heating/cooling circuits HK1-HK3. In this way, a temperature profile can be created in and for the floor F of the temperature control block 5.

Figure 3B:
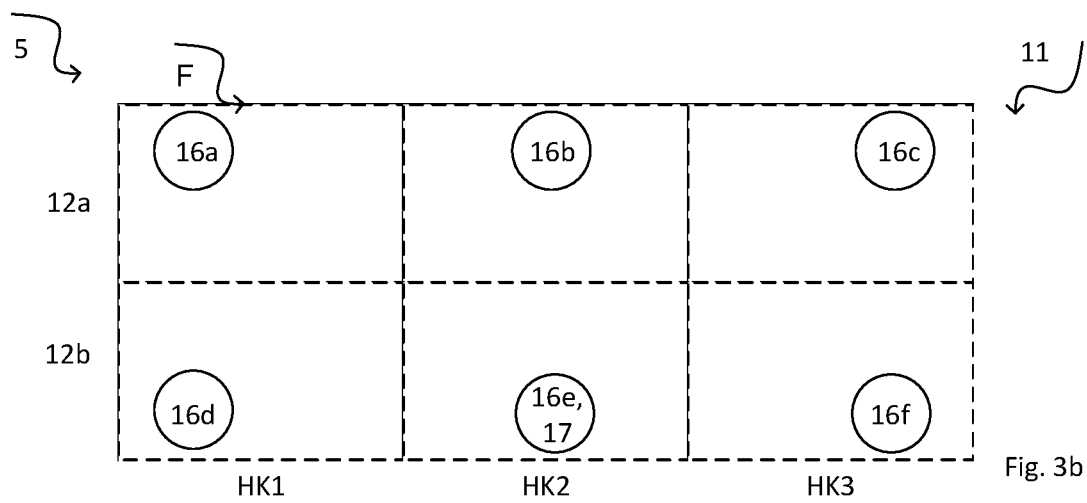
Figure 3C:
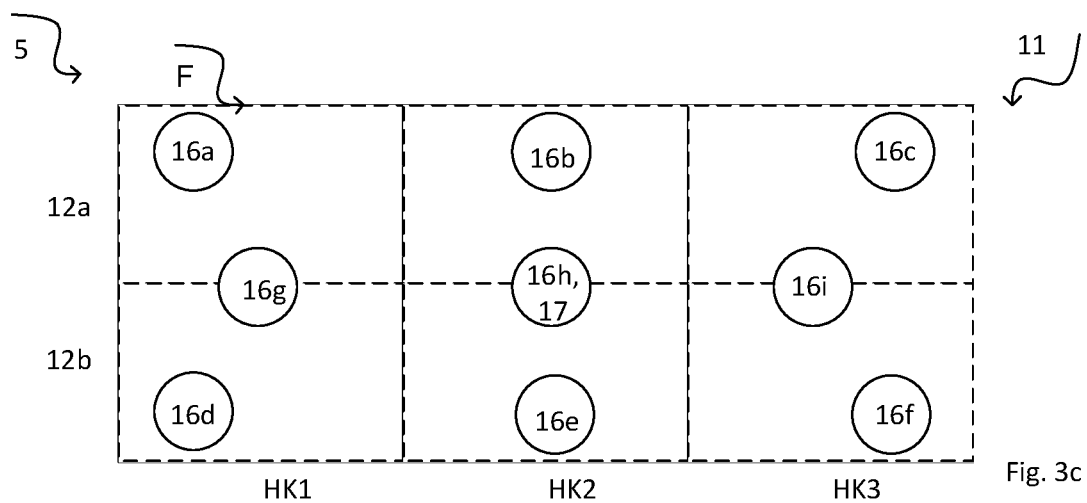

In the embodiment of FIG. 3b, in contrast, six temperature sensors 16a-16f and a reference element 17 are provided and in the embodiment of FIG. 3c nine temperature sensors 16a-16i and a reference element 17 are arranged in the region of the floor F. The reference element 17 is, in each case, arranged together with one of the utilized temperature sensors 16 (FIG. 3b:16e; FIG. 3c: 16h). It is, however, likewise an option to arrange the reference element 17 independently of a temperature sensor 16. Likewise it is an option to use a plurality of reference elements 17, which can, in each case, be arranged neighboring, or spaced from, temperature sensors 16.

The invention claimed is:

1. A device for thermal treatment of samples, the device comprising:
   a base unit including a receiving area configured to receive at least one sample carrier;
   a temperature control block disposed in the receiving area;
   a lid adapted to close the receiving region, which lid is configured to exert a predeterminable pressing force on the sample carrier disposed in the temperature control block when the lid is in an application position;
   a temperature sensor configured to detect a temperature of the temperature control block;
   a control unit configured to facilitate heating and cooling of the temperature control block to predeterminable temperatures; and
   a reference element configured for in situ calibrating, validating and/or adjusting of at least the temperature sensor, wherein the reference element is comprised of a reference material having at least one phase change at at least one predetermined phase change temperature, during which at least one phase change the reference material remains in the solid state, wherein the at least one phase change occurs in a temperature range suitable for calibrating the temperature sensor;
   wherein the temperature sensor and the reference element are introduced into the temperature control block.

2. The device of claim 1, wherein the reference material of the reference element is a ferroelectric material, a ferromagnetic material or a superconductor.

3. The device of claim 1, further comprising an electronics configured to determine the at least one phase change based on a characteristic physical or chemical variable of the reference material, wherein the at least one characteristic physical or chemical variable is a crystal structure, a volume, or a dielectric, electrical, or magnetic property of the reference material.

4. The device of claim 1, wherein the temperature sensor and the reference element are introduced into a floor region of the temperature control block.

5. The device of claim 1, wherein at least one temperature sensor and the reference element are arranged next to each other such that the at least one temperature sensor and the reference element are exposed to essentially the same temperature.

6. The device of claim 1, wherein the device comprises at least two temperature sensors which are disposed in different areas of the temperature control block.

7. The device of claim 1, wherein the temperature sensor is arranged at a predeterminable distance from the reference element.

8. The device of claim 1, wherein the device is adapted as a thermocycler, a real time thermocycler, a thermoshaker or an incubator.

9. A method for operating the device according to claim 1, the method comprising:

detecting a phase change in the reference element based on a change of a characteristic physical or chemical reference variable of the reference element as a function of time;

determining a phase change point in time at which the phase change occurs;

determining a measured value of a temperature of the temperature sensor at a measuring point in time, which has a shortest length of time from the phase change point in time; and comparing the temperature measured value with the phase change temperature and/or determining a difference between the temperature measured value and the phase change temperature.

10. The method of claim 9, further comprising:
in a checking mode, heating or cooling the temperature control block such that the phase change occurs in the reference element.

11. The method of claim 9, further comprising:
determining whether the difference between the temperature measured value and the phase change temperature exceeds a predeterminable limit value.

12. The method of claim 9, further comprising:
performing condition monitoring of the temperature sensor based on the comparison between the temperature measured value and the phase change temperature.

13. The method of claim 9, further comprising:
performing a reconciliation of the temperature sensor based on the comparison between the temperature measured value and the phase change temperature.

14. The method of claim 9, further comprising:
setting a heating power and/or cooling power via the control unit based on the comparison between the temperature measured value and the phase change temperature.

15. The device of claim 1, wherein the temperature sensor and the reference element are introduced into at least one bore in a floor region of the temperature control block.

16. The device of claim 15 wherein the at least one bore includes a lateral bore.

17. The device of claim 15 wherein the temperature sensor is one of a plurality of temperature sensors introduced into the floor region.

18. The device of claim 17 further comprising a plurality of heating/cooling circuits, and the plurality of temperature sensors are each introduced into a respective region of one of the heating/cooling circuits so as to create a temperature profile of the floor region.

19. A device for thermal treatment of samples, the device comprising:
a base unit including a receiving area configured to receive at least one sample carrier;
a temperature control block disposed in the receiving area;
a lid adapted to close the receiving region, which lid is configured to exert a predeterminable pressing force on the sample carrier disposed in the temperature control block when the lid is in an application position;
a temperature sensor configured to detect a temperature of the temperature control block;
a reference element configured for in situ calibrating, validating and/or adjusting of at least the temperature sensor, wherein the reference element is comprised of a reference material having at least one phase change at at least one predetermined phase change temperature, during which at least one phase change the reference material remains in the solid state, wherein the at least one phase change occurs in a temperature range suitable for calibrating the temperature sensor;
a control unit configured to facilitate heating and cooling of the temperature control block to predeterminable temperatures, and the control unit being further configured to:
detect a phase change in the reference element based on a change of a characteristic physical or chemical reference variable of the reference element as a function of time;
determine a phase change point in time at which the phase change occurs;
determine a measured value of a temperature of the temperature sensor at a measuring point in time, which has a shortest length of time from the phase change point in time;
compare the temperature measured value with the phase change temperature and/or determine a difference between the temperature measured value and the phase change temperature; and
perform a reconciliation of the temperature sensor based on the comparison between the temperature measured value and the phase change temperature.

* * * * *